(12) United States Patent
Mousavi Hondori et al.

(10) Patent No.: US 11,686,028 B1
(45) Date of Patent: Jun. 27, 2023

(54) SYSTEM AND METHOD FOR AUTOMATED JOINING OF FABRIC PIECES

(71) Applicant: CreateMe Technologies LLC, New York, NY (US)

(72) Inventors: Hossein Mousavi Hondori, Mountain View, CA (US); Mostafa Ghobadi Shahreza, San Francisco, CA (US); Weixin Yang, San Francisco, CA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/592,368

(22) Filed: Feb. 3, 2022

Related U.S. Application Data

(60) Provisional application No. 63/295,196, filed on Dec. 30, 2021.

(51) Int. Cl.
| | |
|---|---|
| *D06C 3/10* | (2006.01) |
| *B25J 13/08* | (2006.01) |
| *B25J 15/00* | (2006.01) |
| *B25J 9/16* | (2006.01) |
| *D06C 27/00* | (2006.01) |

(52) U.S. Cl.
CPC .............. *D06C 3/10* (2013.01); *B25J 9/1633* (2013.01); *B25J 13/085* (2013.01); *B25J 15/0071* (2013.01); *D06C 27/00* (2013.01); *B25J 9/1682* (2013.01)

(58) Field of Classification Search
CPC . D06C 3/10; D06C 27/00; D06C 3/00; D06C 3/021; D06C 3/062; B25J 9/1633; B25J 13/085; B25J 15/0071; B25J 9/1682; B25J 11/005; B25J 9/1679; B25J 9/1669; B25J 15/0052; B25J 15/009; B25J 15/086; B25J 15/106; B25J 15/0253; B25J 9/1602; B25J 15/008; D05B 3/12; D05B 5/00; D05B 7/00; G05B 2219/2626; G05B 2219/45195; G05B 2219/4705; A61B 17/0491; A61B 2017/00349
See application file for complete search history.

(56) References Cited

U.S. PATENT DOCUMENTS

| | | | |
|---|---|---|---|
| 2007/0116795 A1* | 5/2007 | Sayers ................... | B29C 70/56 425/395 |
| 2012/0078053 A1* | 3/2012 | Phee .................. | A61B 1/00147 600/139 |

(Continued)

FOREIGN PATENT DOCUMENTS

| | | | | |
|---|---|---|---|---|
| CN | 113151989 A | * | 7/2021 | |
| WO | WO-2015075779 A1 | * | 5/2015 | ............ B25J 9/0087 |

OTHER PUBLICATIONS

"Douglas College Physics Textbook" OpenStax, College Physics. OpenStax CNX, Aug. 22, 2016 (Year: 2016).*

*Primary Examiner* — Abbyy Lin
*Assistant Examiner* — Esvinder Singh

(57) ABSTRACT

One embodiment can provide an apparatus. The apparatus can include a robotic arm, a pair of jaws coupled to the robotic arm configured to grip a fabric piece at a pair of predetermined locations, a force sensor coupled to the jaws and configured to measure a tension force applied to the fabric piece by the jaws, and a control module configured to control movements of at least one jaw based on the measured tension force, thereby allowing the fabric piece to be stretched.

19 Claims, 10 Drawing Sheets

(56) References Cited

U.S. PATENT DOCUMENTS

| | | | | |
|---|---|---|---|---|
| 2017/0157779 | A1* | 6/2017 | Todorov | B25J 11/0095 |
| 2019/0374220 | A1* | 12/2019 | Fischell | A61B 17/06109 |
| 2020/0222128 | A1* | 7/2020 | Ott | B25J 9/1633 |
| 2020/0405405 | A1* | 12/2020 | Shelton, IV | B25J 9/1689 |
| 2021/0060821 | A1* | 3/2021 | Vanhoech | B29B 17/02 |
| 2021/0370517 | A1* | 12/2021 | Bixby | B25J 15/0206 |

* cited by examiner

SYSTEM AND METHOD FOR AUTOMATED JOINING OF FABRIC PIECES

RELATED APPLICATION

This application claims the benefit of U.S. Provisional Application No. 63/295,196, titled "System and Method for Automated Joining of Fabric Pieces," by inventors Hossein Mousavi Hondori, Mostafa Ghobadi Shahreza, and Weixin Yang, filed on 30 Dec. 2021, the disclosure of which is incorporated herein by reference in its entirety.

BACKGROUND

Field

This disclosure is generally related to automation in garment fabrication. More specifically, this disclosure is related to an automated system and method for joining two pieces of fabric.

Related Art

Automation (e.g., the use of robotic systems) has been widely used and is transforming manufacturing in various industries. Nevertheless, while the global demand for clothing has increased because of increased population, changes in consumer attitude toward fast fashion, and an increase in the average income in many countries, automation in garment manufacturing is still mainly focused on fabric production. The actual assembly of garments, which typically involves sewing operations, remains largely dependent on skilled manual labor. The cost of sewing can be between 30% and 60% of the total cost of garment fabrication.

Increasing labor costs have become an important driving force of garment-assembly automation. Relatively simple sewing operations, such as sewing a button or a pocket, can be done by robots. More complicated sewing or fabric attachment operations that involve two fabric pieces having different lengths, contours, or curvatures (e.g., attaching sleeves) remain challenging for robots.

SUMMARY

One embodiment can provide an apparatus. The apparatus can include a robotic arm, a pair of jaws coupled to the robotic arm configured to grip a fabric piece at a pair of predetermined locations, a force sensor coupled to the jaws and configured to measure a tension force applied to the fabric piece by the jaws, and a control module configured to control movements of at least one jaw based on the measured tension force, thereby allowing the fabric piece to be stretched.

In a variation on this embodiment, while controlling the movement of the at least one jaw, the control module is configured to compare the measured tension force with a predetermined desired tension force.

In a further variation, the control module is further configured to determine the predetermined desired tension force based on one or more of: a material type associated with the fabric piece, a thickness of the fabric piece, a weaving pattern of the fabric piece, a garment-design criterion, and an environmental temperature.

In a further variation, the control module is further configured to determine a tension-jaw displacement curve indicating a relationship between the tension force applied to the fabric piece and a displacement between the jaws, select a point in a linear region of the tension-jaw displacement curve, and determine the desired tension force based on the selected point.

In a further variation, the control module is further configured to stop the movement of the at least one jaw in response to the measured tension force substantially matching the desired tension force, thereby achieving a desired stretching effect on the fabric piece.

In a variation on this embodiment, a respective jaw comprises a fabric-gripping mechanism configured to grip the fabric piece at the corresponding predetermined location, and the fabric-gripping mechanism comprises a plurality of needles or a high-friction surface.

In a further variation, the fabric-gripping mechanism comprises an actuator for engaging and disengaging the fabric piece.

In a variation on this embodiment, the force sensor comprises a load cell and one or more strain gauges.

In a variation on this embodiment, the apparatus further comprises a motor for moving the at least one jaw.

In a variation on this embodiment, the controller module comprises a proportional-integral-derivative (PID) controller.

One embodiment provides a computer-implemented method. The method can include controlling a pair of jaws coupled to a robotic arm to grip a fabric piece at a pair of predetermined locations, moving at least one jaw such that the pair of jaws stretch the fabric piece between the pair of predetermined locations, measuring a tension force applied the fabric piece by the jaws, and in response to the measured tension force substantially matching a predetermined desired tension force, stopping the movement of the at least one jaw, thereby achieving a desired stretching effect on the fabric piece.

One embodiment can provide a garment manufacturing system. The system can include a computer-vision module configured to determine a plurality of joinder locations on corresponding edges of to-be-joined fabric pieces, a robotic arm comprising a pair of jaws configured to grip a fabric piece at a pair of joinder locations, a force sensor coupled to the jaws and configured to measure a tension force applied to the fabric piece by the jaws, a control module configured to control movements of at least one jaw based on the measured tension force, thereby allowing the fabric piece to be stretched, and a fabric-joining module configured to join the to-be-joined fabric pieces at the corresponding edges.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of using an automated tool to join two fabricated pieces. The automated tool can include a robotic arm that can pick up a piece of fabric under the guidance of a computer-vision system. The computer-vision system can be configured to identify joinder points on the edge of the fabric piece. The end effector attached to the robotic arm can include two parallel jaws, with at least one jaw being movable (e.g., including an actuator). Each jaw can include a fabric gripper for gripping the fabric piece at a particular point. The two parallel jaws can grip the fabric at adjacent joinder points. Moreover, each jaw can include a strain gauge for measuring the amount of the tension force the fabric is subject to when the jaws open and close. The parallel jaws can stretch the portion of the fabric piece between the jaws to facilitate automated joining (e.g., sewing or applying adhesion) of the fabric pieces. More specifically, the amount of stretching (or the movements of the jaws) can be controlled based on the measured tension.

Automated Fabric-Joining System

Figure 1:
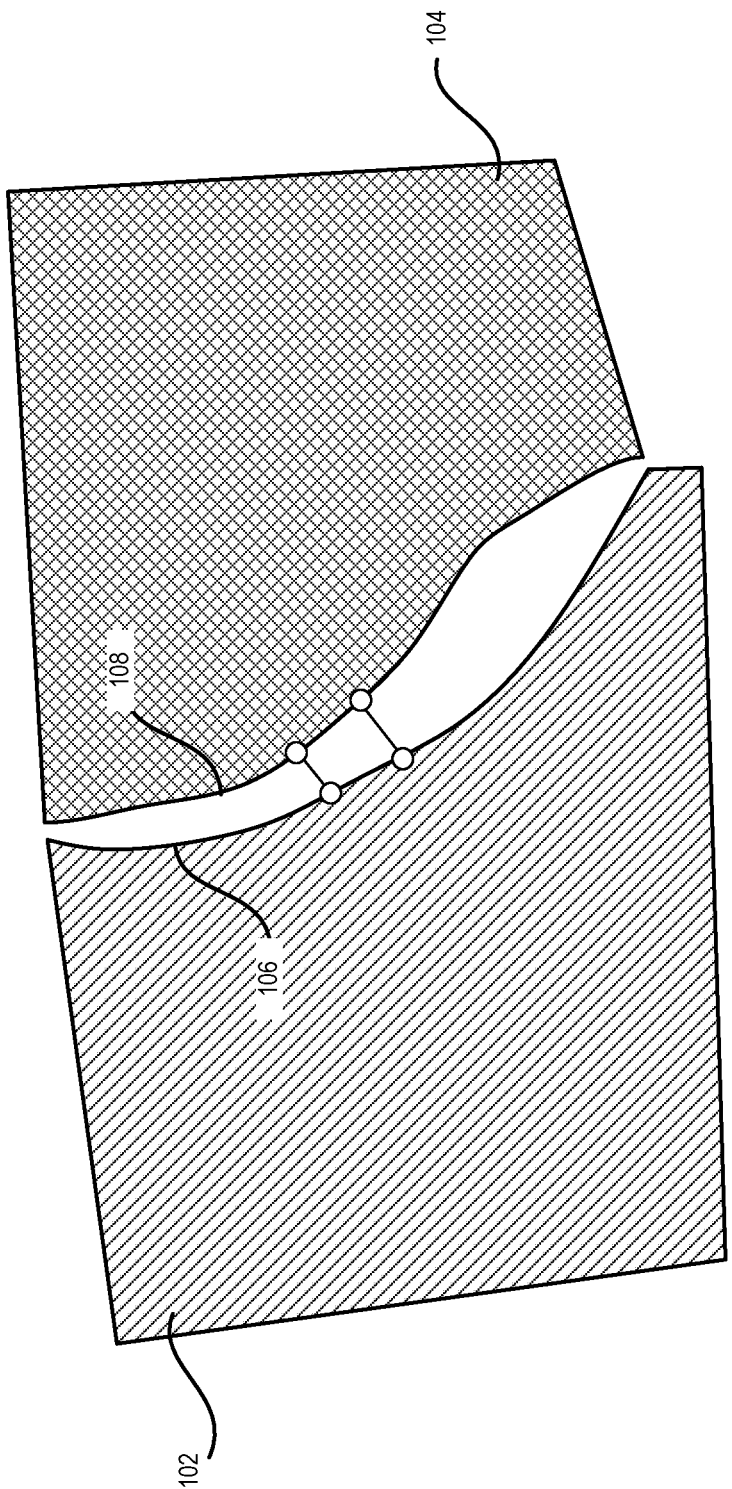
FIG. 1 illustrates exemplary fabric pieces that are to be made into a T-shirt.

FIG. 1 illustrates exemplary fabric pieces that are to be made into a T-shirt. More specifically, left-side fabric piece 102 can be the front panel of the T-shirt and right-side fabric piece 104 can be the sleeve of the T-shirt. FIG. 1 also shows that left-side fabric piece 102 has a curved edge 106 and right-side fabric piece 104 has a curved edge 108. When making the T-shirt, one needs to join (e.g., sew) edge 106 with edge 108. As one can see from FIG. 1, edges 106 and 108 have different curvatures and lengths. This is because the human body is a three-dimensional (3D) structure, and the T-shirt is designed to provide a good fit to the 3D human body by joining pieces of fabric that are cut into two-dimensional (2D) patterns.

When the T-shirt is to be made manually, a human (e.g., a skilled seamstress) can sew fabric pieces 102 and 104 together. During sewing, the seamstress can line up edges 106 and 108 at their corresponding ends and use his or her real-time visual and haptic feedback to match and stitch the correct points on each edge together. For example, using a sewing machine, they can start from one end and, as they move to the other end, straighten and join about one inch of fabric from each side at a time and feed the fabric pieces under the presser foot of the sewing machine to stitch the fabric pieces together. By the time they reach the other end, the two fabric pieces are joined. During sewing, the seamstress can make constant adjustments (e.g., stretching one fabric piece while compressing the other piece) to match the length of the two pieces in order to achieve the desired effect. Such maneuvers can be hard to mimic in an automated setting.

A computer-vision system can locate the correct matching points (also referred to as the joinder points, as indicated by the hollow circles in FIG. 1) on the two fabric pieces. The joinder points are locations where the two fabric pieces are fixed or attached together (e.g., "pinched") similar to the way a tailor feeds a segment of each fabric piece to the sewing machine. The matching joinder points can be determined to ensure that each of the edge segments between two adjacent joinder points can have a predetermined length. For example, depending on the design of the garment, the corresponding edge segments of the two fabric pieces may have the same length or different lengths. Detailed descriptions of the computer-vision system for determining the joinder points on fabric pieces can be found in U.S. patent application Ser. Nos. 17/363,783, 11/203,826, entitled "SYSTEM AND METHOD FOR DETERMINING JOINDER LOCATIONS FOR ASSEMBLY OF GARMENTS," by inventors Hossein Mousavi Hondori, Gopi Vinod Avvari, and Weixin Yang, filed 30 Jun. 2021, the disclosure of which is incorporated by reference herein.

The determination of the joinder points on fabric pieces can ensure that the mismatch of lengths, contour, shape, stretching, tension, or other fabric property between two consecutive joinder points can be tolerated by the fabric-joining method, but does not accumulate along the seam, because such mismatch is reset at each joinder point.

Once the joinder points on two to-be-joined fabric pieces are determined, an automated joining process (such as an automated linear sewing process) can be used to join the edges between the joinder points. According to one embodiment, an automated fabric-joining system can include a pair of robotic arms for picking up the fabric pieces at the predetermined joinder points. Compared with other robotic systems that use robotic arms to pick up rigid components, the robotic arms in the fabric-joining system can pick up soft fabric pieces, whereas conventional robotic gripping may not be suitable. Moreover, because the fabric piece is soft and stretchable, when the robotic arm picks up a fabric piece at the desired joinder points, the edge of the fabric piece may not maintain its shape (there can be wrinkles at the edge or the fabric piece can be sagging), thus making it difficult for the fabric-joining system to perform the subsequent joining (e.g., sewing, stapling, applying adhesive, fusing, etc.) operation.

To overcome the above problem, according to one embodiment, the robotic system can include a mechanism to stretch out the fabric piece along the predetermined joinder points to remove wrinkles and to ensure that the to-be-joined edge segments have substantially similar lengths such that the pair of robotic arms can bring the to-be-joined edge segments together (e.g., overlap the two segments).

Figure 2A:
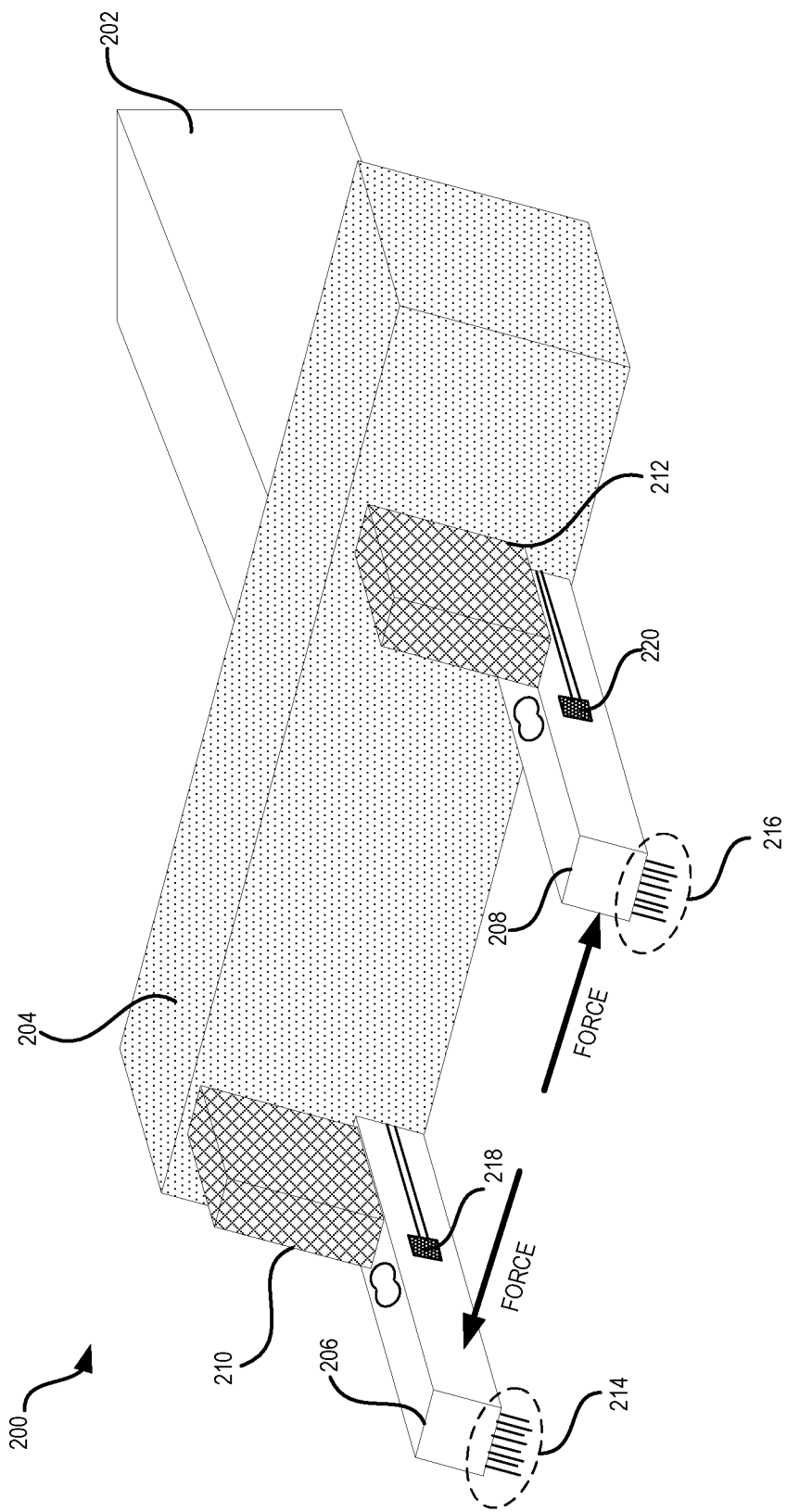
FIG. 2A illustrates an exemplary robotic arm for picking up a fabric piece, according to one embodiment of the present invention.

FIG. 2A illustrates an exemplary robotic arm for picking up a fabric piece, according to one embodiment of the present invention. In FIG. 2A, a robotic arm 200 includes a base 202, a wrist 204, and a pair of parallel jaws 206 and 208. Base 202 can be mounted to a supporting structure (not shown in FIG. 2A) of robotic arm 200. Depending on the practical need (e.g., the mechanical design of the automated fabric-joining system), base 202 and the supporting structure and the way they are coupled can have different formations. Their shapes, sizes, and coupling mechanisms do not limit the scope of this disclosure.

Wrist 204 couples the end effector of robotic arm 200 to base 202. Wrist 204 can rotate around the end of base 202. According to one embodiment, robotic arm 200, which includes base 202 and wrist 204, can have six degrees of freedom to provide sufficient flexibility in picking up fabric pieces.

The end effector of robotic arm 200 can be a parallel gripper that includes a pair of parallel jaws 206 and 208. Parallel jaws 206 and 208 can move in a parallel motion. For example, both jaws or at least one jaw can move in a direction perpendicular to the longitudinal axis of each jaw to facilitate the opening and closing of the parallel jaws. In one embodiment, each parallel jaw can include a load cell that can convert forces applied to the parallel jaw to electrical signals. Detailed description of the load cell will follow.

In the example shown in FIG. 2A, each jaw can be coupled to a motion-control module that controls an actuator to move the jaw from one place to another. For example, parallel jaw 206 can be coupled to a motion-control module 210, and parallel jaw 208 can be coupled to a motion-control module 212. Various types of actuators (e.g., step motors or servomotors) can be used to move the jaws, and various types of control mechanisms (e.g., electrical control, hydraulic control, pneumatic control, piezoelectric control, etc.) can be used to control the actuators. The scope of this disclosure is not limited to the type of actuator and the type of control mechanism used for moving the parallel jaws.

In FIG. 2A, both jaws are movable. In practice, it is also possible to have only one movable jaw, while the other jaw has a fixed position with respect to wrist 204. For example, parallel jaw 206 can be a fixed jaw, and parallel jaw 208 can be movable in a direction that is substantially perpendicular to the longitudinal axis of parallel jaw 208. In other words, parallel jaw 208 can move closer to or further away from parallel jaw 206.

Each parallel jaw can include a fabric-attaching module (e.g., fabric-attaching modules 214 and 216) for attaching a fabric piece to the parallel jaw. More specifically, a fabric piece can be attached to the parallel jaw near or at a predetermined joinder point. Similarly, an adjacent joinder point can be attached to or located near the other parallel jaw, such that the fabric piece can be picked up by robotic arm 200 along two adjacent joinder points. According to one embodiment, the fabric-attaching module can include a plurality of needles for picking up the fabric piece. The fabric-attaching module can include a high friction surface that can attach to fabric surfaces.

Figure 2B:
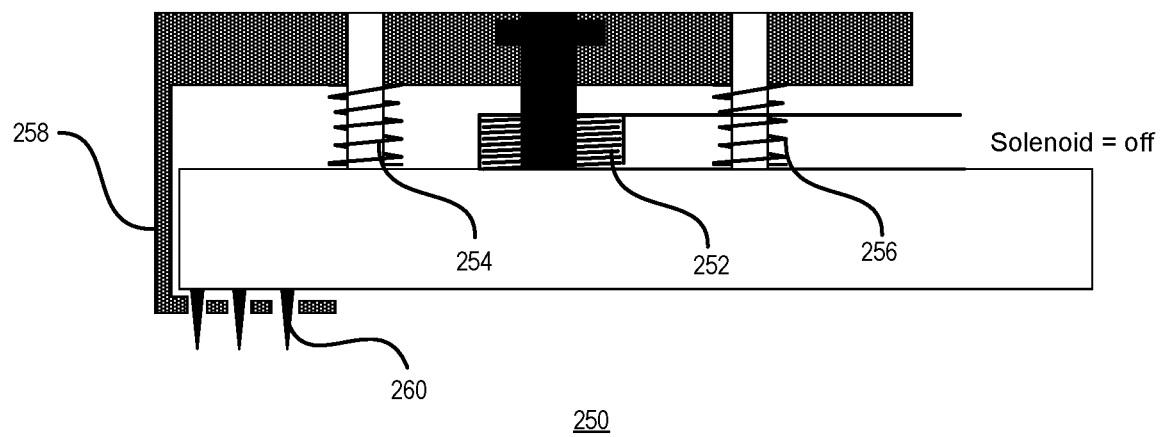
FIG. 2B illustrates an exemplary fabric-attaching module, according to one embodiment of the present invention.
Figure 2B:
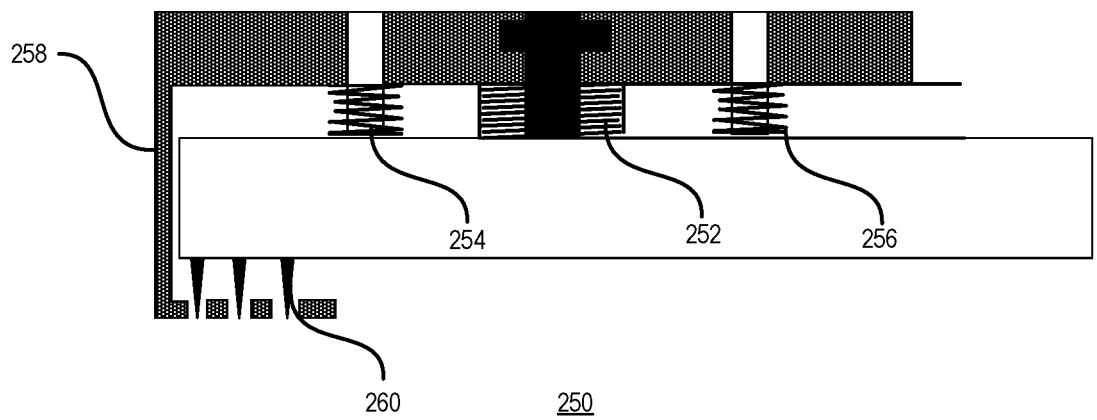

During normal operation of the robotic arm, the fabric-attaching module can engage (e.g., attach to) and disengage (e.g., be removed from) the fabric piece based on need. In some embodiments, the fabric-attaching module can include a solenoid actuator that can cause the fabric-attaching module to engage or disengage the fabric piece. More particularly, the fabric-attaching module can include a reverse stapling mechanism driven by the solenoid actuator, where instead of staplers a guard for the staplers is pushed out by the actuator. FIG. 2B illustrates an exemplary fabric-attaching module, according to one embodiment of the present invention. In FIG. 2B, a fabric-attaching module 250 can include a solenoid actuator 252, one or more springs (e.g., springs 254 and 256), a guard structure 258, and a number of needles (e.g., needle 260).

The top drawing of FIG. 2B shows that, when solenoid actuator 252 is in an "off" state, springs 254 and 256 can remain in their natural non-compressed state, thus pushing guard structure 258 away from the tip of the needles. Consequently, the needles are exposed, allowing fabric-attaching module 250 to pick up the fabric piece. The bottom drawing of FIG. 2B shows that, when solenoid actuator 252 is in an "on" state, springs 254 and 256 can be compressed. Consequently, guard structure 258 can be pulled by gravity to prevent the needle tips from being exposed. This can cause fabric-attaching module 250 to disengage the fabric piece. In addition to the arrangement shown in FIG. 2B, it is also possible to have retractable needles. For example, the solenoid actuator can be turned on to push the needles out and turned off to retract the needles.

Figure 3:
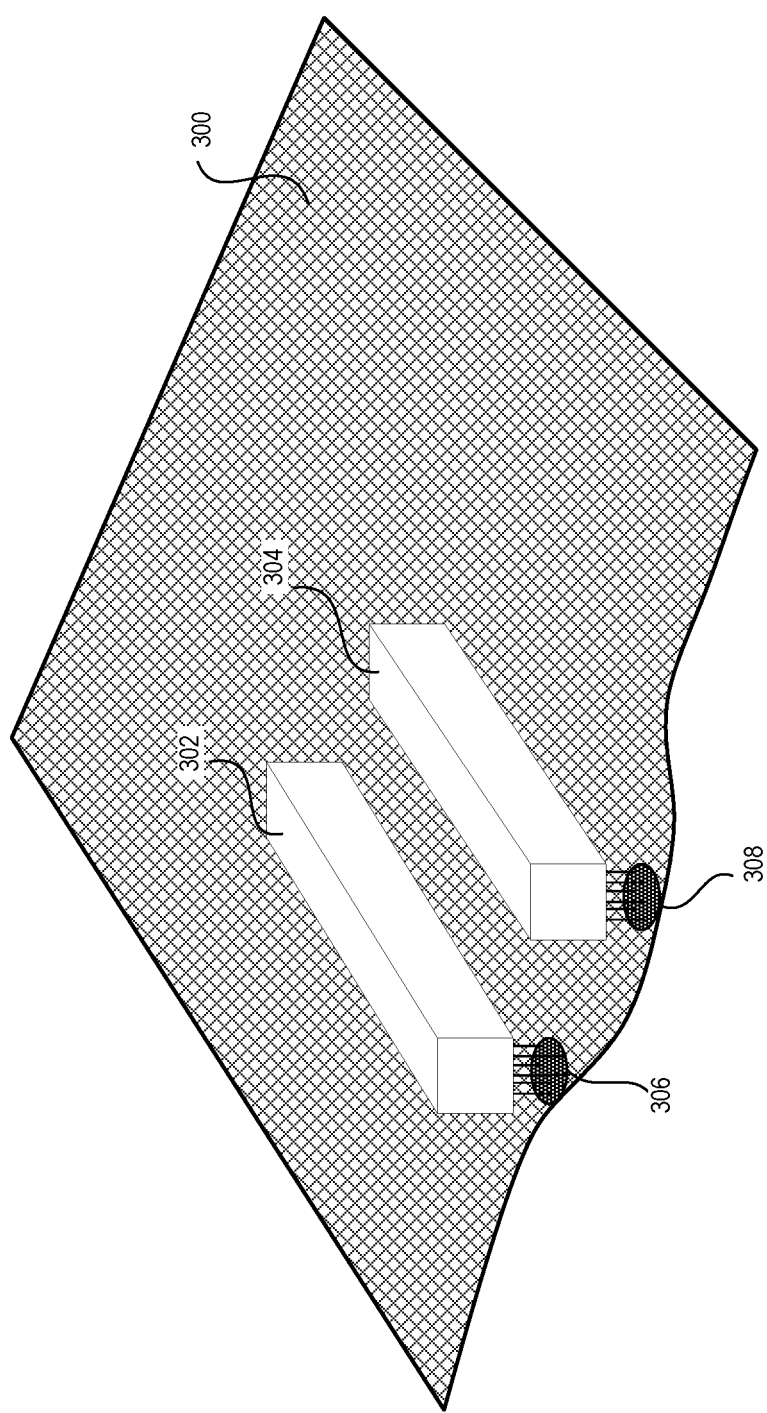
FIG. 3 illustrates an exemplary scenario of a fabric piece attached to the parallel jaws, according to one embodiment of the present invention.

FIG. 3 illustrates an exemplary scenario of a fabric piece being attached to the parallel jaws, according to one embodiment of the present invention. In FIG. 3, a fabric piece 300 is attached to parallel jaws 302 and 304 at joinder points 306 and 308, respectively. For simplicity of illustration, other parts of the robotic arm are not shown in FIG. 3, and joinder points 306 and 308 are shown much larger than their actual size. One can see from FIG. 3 that the fabric segment between joinder points 306 and 308 will be expanded when jaws 302 and 304 move away from each other. If there were wrinkles between joinder points 306 and 308 when fabric piece 300 was picked, those wrinkles can be smoothed out. Because most fabric materials are stretchable, after the wrinkles are smoothed out, if parallel jaws 302 and 304 continue to move apart, the fabric segment between joinder points 306 and 308 can be stretched beyond its original length. Note that the fabric segment would experience a certain amount of tension force (which can cause deformation of the fabric) when it is stretched beyond its original shape. Hence, by detecting the amount of tension force applied to the fabric, the automated system can determine whether the wrinkles in the fabric piece are smoothed out.

Depending on the resolution, the computer-vision system may determine a relatively large number (e.g., hundreds) of joinder points on edges of the fabric pieces. However, joinder points 306 and 308 are not necessarily adjacent to each other in the determined joinder points. There can be multiple other joinder points between joinder points 306 and 308. In one embodiment, the distance between joinder points where the robotic arm picks up a fabric piece can be between one and two inches. This distance can also be variable, depending on the curvature of the to-be-joined fabric pieces. For example, if both fabric pieces have straight edges, the robotic arm may pick up the fabric piece at joinder points that are further away; whereas if the edge(s) is curved, the robotic arm may pick up the fabric piece at joinder points that are closer to each other. To ensure that the fabric pieces are joined correctly, the two robotic arms can pick up the fabric pieces at corresponding joinder points.

Figure 4:
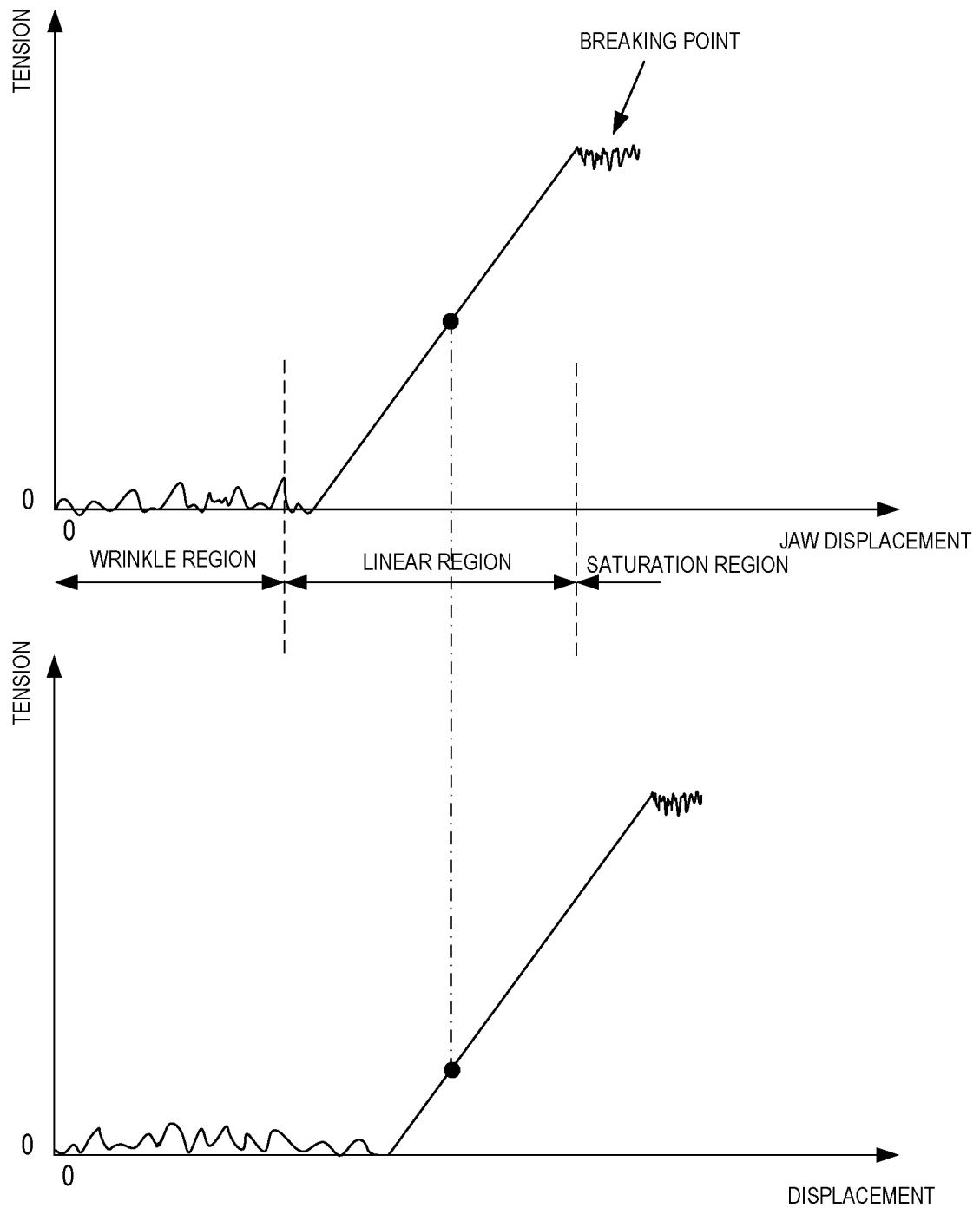
FIG. 4 illustrates exemplary relationships between the displacement of the parallel jaws and the amount of tension force applied to the fabric pieces, according to one embodiment of the instant application.

FIG. 4 illustrates exemplary relationships between the displacement of the parallel jaws and the amount of tension force applied to the fabric pieces, according to one embodiment of the instant application. More specifically, the top drawing shows the amount of strain in the fabric as a function of the displacement between the parallel jaws for a first fabric piece, and the bottom drawing shows the amount of strain in the fabric as a function of the displacement between the parallel jaws for a second fabric piece to be joined with the first fabric piece. According to one embodiment, the displacement can be the distance between the parallel jaws, which are configured to pick up the fabric piece at joinder points.

The top drawing shows that when the distance between the parallel jaws is small (e.g., within the wrinkled region), the fabric piece is wrinkled and there is no tension in the fabric. As the distance increases, the wrinkles are smoothed out; increasing the distance between the jaws starts to cause tension in the fabric. The amount of tension experienced by the fabric and the distance between the jaws can be in a linear relationship, i.e., the further apart the jaws, the greater the tension. When the jaws continue to separate beyond the linear region, the amount of tension force can be saturated, and the fabric piece may be broken or torn.

To facilitate successful joining between the fabric pieces, it is desirable to have a straight, wrinkle-free interface. In other words, it is desirable to have the parallel jaws operate in the linear region when the fabric pieces are joined. This is similar to a tailor straightening the edges of fabric pieces before manually sewing them or before feeding them into a sewing machine. Hence, by measuring the amount of tension as a function of jaw displacement, the automated system can obtain the tension vs. displacement curve shown in FIG. 4. Based on the measured curve, the system can determine whether the jaws are operating in the linear region, meaning that the fabric segment has been properly stretched out and is ready for the joining.

According to one embodiment, the automated system can select a random point within the linear region on the tension-displacement curve and use the corresponding displacement value to control the operation of the jaws. In some embodiments, the automated system can select a point at the beginning of the linear region, such that wrinkles in the fabric segment can be removed by applying a minimal amount of tension. Once the parallel jaws pick up the fabric pieces at the joinder points, the parallel jaws can move according to the corresponding displacement value of the selected point. In situations where the fabric segments on both to-be-joined pieces have the same length, the jaws on the two robotic arms can operate in a similar way by selecting the same point on the tension-displacement curve.

Due to the difference in length and curvature of the to-be-joined edges of the two fabric pieces (e.g., edges 106 and 108), the segment length between the joinder points on one fabric piece may be different from the segment length between the matching joinder points on the other fabric piece. The bottom drawing of FIG. 4 shows the tension-displacement curve for the corresponding edge segment on the second fabric piece. Compared with the top tension-displacement curve shown in FIG. 4, the wrinkled region in the top tension-displacement curve is longer, meaning that the edge segment between the joinder points on the second fabric piece is longer than the corresponding edge segment between the matching joinder points on the first fabric piece. To ensure that these two edge segments can be joined properly (e.g., in an overlapping fashion), both segments can be stretched by the parallel jaws to substantially the same length, as indicated by the dots on the tension-displacement curves. Note that the dots correspond to the same jaw displacement but different amounts of tension. In this example, the second fabric piece with the longer segment will be stretched to a lesser degree and, hence, experience a smaller amount of tension.

In the example shown in FIG. 4, the two fabric pieces are made of the same fabric material and the slopes of the linear regions in the top and bottom tension-displacement curves are the same. In certain situations, fabric pieces of different types of material may need to be joined. Because different types of material may have different elasticity, the slopes of the different tension-displacement curves can be different. In some embodiments, a database that stores the mapping between the tension force in the fabric and the displacement (i.e., the amount of deformation) of the fabric can be created and maintained. For example, the database can store the tension-displacement mapping relationship for each type of fabric material (e.g., cotton, denim, silk, nylon, flannel, etc.). Furthermore, the displacement can be normalized. For example, the database can include information regarding the amount of tension experienced by a fabric piece when the fabric piece is stretched by a certain percentage beyond its original length. For the same material, the thickness and/or weaving pattern of the fabric may also affect the tension-displacement mapping relationship. Moreover, temperature of the environment may also affect how the fabric reacts to the tension force.

Various techniques can be used to obtain the tension-displacement mapping relationship. In some embodiments, a robotic arm can be configured to operate in an exploration mode to pick up and stretch different types of fabric to obtain the tension-displacement curve for the different types of fabric. Once a sufficient amount of data is accumulated, a machine-learning technique can also be used to train a model to model the tension-displacement relationship of a certain fabric piece, based on its material type, thickness, weaving pattern, environmental temperature, etc.

Figure 5:
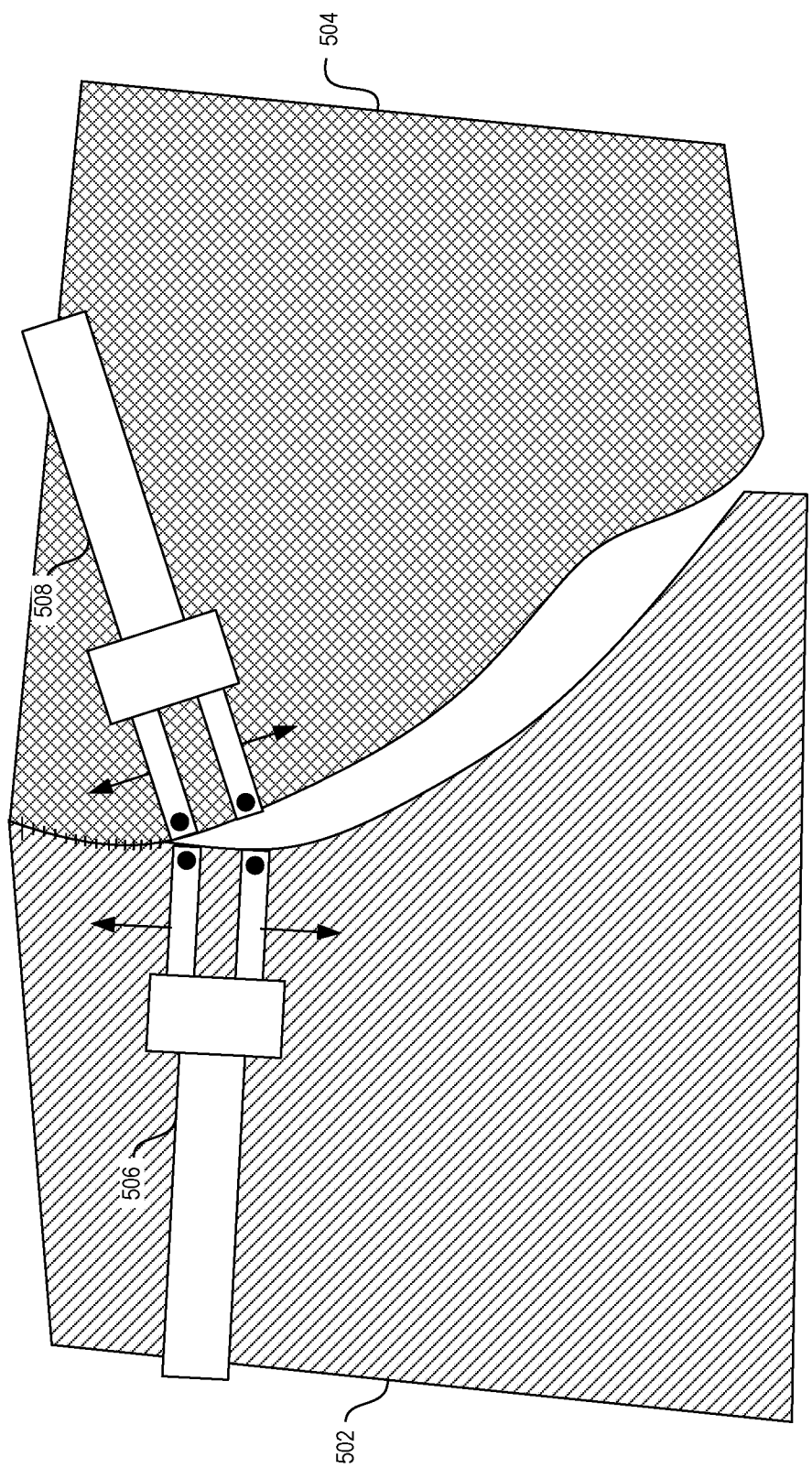
FIG. 5 illustrates a scenario where two robotic arms pick up fabric pieces for joining, according to one embodiment of the present invention.

FIG. 5 illustrates a scenario where two robotic arms pick up fabric pieces for joining, according to one embodiment of the present invention. More specifically, FIG. 5 shows that fabric pieces 502 and 504 are partially joined (e.g., sewn together) at their respective edges. To continue the joining operation, a robotic arm 506 can pick up fabric piece 502 along its edge at a pair of predetermined joinder points, and a robotic arm 508 can pick up fabric piece 504 along its edge at a pair of matching joinder points. According to one embodiment, the parallel jaws on each robotic arm can move apart (as indicated by the arrows) to straighten out the edge portion (e.g., removing all wrinkles). Moreover, the parallel jaws are configured to stretch each edge segment such that the two edge segments can have a substantially equal length. The robotic arms can then bring the two edge segments close to each other to allow an automated joining operation (e.g., sewing, stapling, applying adhesive, or fusing) to be applied to the edge segments.

As previously discussed in conjunction with FIG. 2A, each parallel jaw can include a load cell. In the example shown in FIG. 2A, the rectangular body of the parallel jaw can be the body of the load cell. Note that once the fabric piece is expanded to its natural shape, the parallel jaws (or load cells) need to apply force to stretch out the fabric further (as indicated by the force arrows shown in FIG. 2A). The counterforce to each jaw can be measured by the corresponding load cell. According to one embodiment, the load cell can be a strain gauge load cell. For example, parallel jaw 206 can include one or more strain gauges (e.g., a strain gauge 218) attached to its body for measuring/sensing force applied to parallel jaw 206, and parallel jaw 208 can include one or more strain gauges (e.g., a strain gauge 220) for measuring/sensing force applied to parallel jaw 208. Note that it is also possible that only one of the parallel jaws includes the strain gauge(s). In a further embodiment, a load cell can include a set of four strain gauges forming a full-bridge circuit (e.g., a Wheatstone bridge) to provide a voltage as the sensor output. Because temperatures of the environment can affect the sensitivity of the gauge sensor, in some embodiments, one needs to consider the environmental temperature when comparing the measured force with a predetermined desired force value.

Figure 6A:
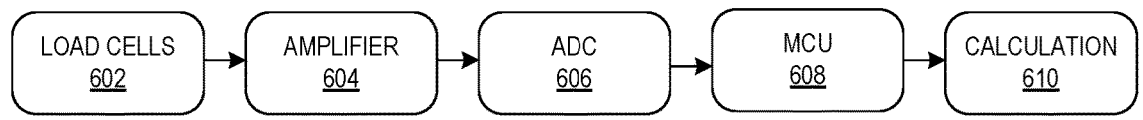
FIG. 6A illustrates an exemplary process for measuring the force applied to the fabric piece, according to one embodiment of the present invention.

FIG. 6A illustrates an exemplary process for measuring the force applied to the fabric piece, according to one embodiment of the present invention. During operation, load cells 602 convert the sensed force to an electrical signal (e.g., a voltage signal). The output of load cells 602 can be amplified by an amplifier 604 and digitized by a high precision analog-to-digital converter (ADC) 606. The digital signal can then be read by a microcontroller unit (MCU) 608 and the measured force value can be calculated by a calculation module 610. The calculated force value can be used as feedback signals to a control loop that controls the movements of the parallel jaws.

Figure 6B:
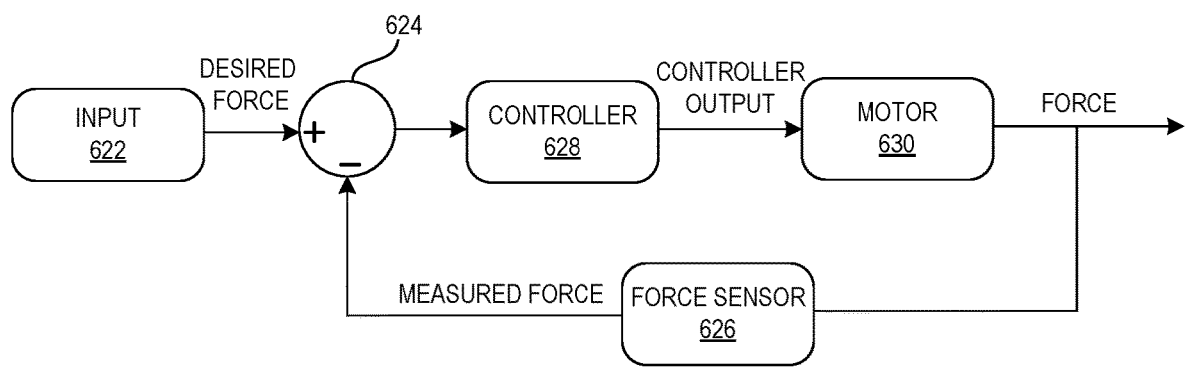
FIG. 6B illustrates an exemplary control loop, according to one embodiment of the present invention.

FIG. 6B illustrates an exemplary control loop, according to one embodiment of the present invention. Control loop 620 can include an input module 622 for inputting a desired tension force value. In one embodiment, the desired tension force value can be determined based on the tension-displacement curves shown in FIG. 4. Control loop 620 can include a comparator module 624 that compares the desired tension force with the tension force measured by a load cell force sensor 626. The comparison result (e.g., the difference between the desired tension and the measured tension) can be sent to a controller 628 which controls a motor 630 that moves the parallel jaw(s). In one embodiment, motor 630 can include a step motor and controller 628 can include a proportional-integral-derivative (PID) controller. Note that movements of the parallel jaws can induce tension force in the fabric, which can then be fed back to controller 628 by load cell force sensor 626. When the measured tension force is the same as the desired tension force, the output of controller 628 can cause motor 630 to stop moving the parallel jaws such that the tension force in the fabric remains at its desired value.

Figure 7:
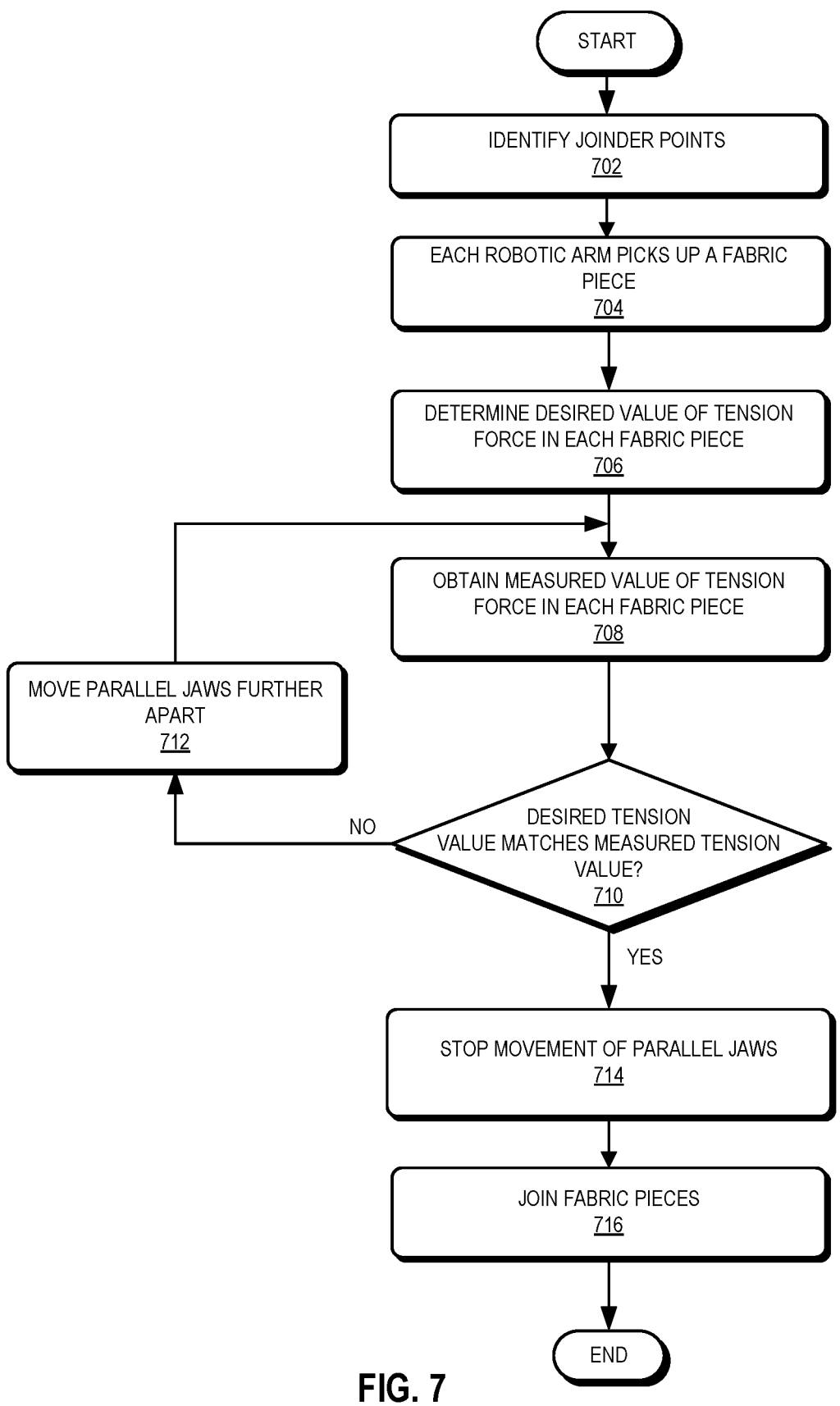
FIG. 7 presents a flowchart illustrating the automated process for joining fabric pieces, according to one embodiment of the present application.

FIG. 7 presents a flowchart illustrating the automated process for joining fabric pieces, according to one embodiment of the present application. During operation, the system uses computer visioning to identify a number of joinder points on edges of the fabric pieces (operation 702). The system can include two robotic arms and each robotic arm can pick up a fabric piece by attaching its end effectors (e.g., a pair of parallel jaws) to a pair of joinder points on the fabric piece (operation 704). Note that, when picking up the fabric piece, the parallel jaws can be close to each other to avoid exerting too much tension on the fabric. To ensure proper joining, the two robotic arms can be configured to pick up fabric pieces at matching joinder points. For example, one robotic arm picks up one fabric piece at a pair of joinder points on its edge, and the other robotic arm picks up the other fabric piece at a matching pair of joinder points, similar to what is shown in FIG. 5. Edge segments between each pair of joinder points are to be joined together.

For each fabric piece, the system can determine a desired value of the tension force in the fabric segment between the parallel jaws (operation 706). In some embodiments, determining the desired value of tension can involve searching a database for a tension-displacement mapping. In further embodiments, the database can be searched based on a number of factors, including but not limited to: the type of the fabric, the thickness of the fabric, the weaving pattern of the fabric, garment-design criteria (e.g., a special folding or draping effect), environmental temperature, etc. Based on the tension-displacement mapping and based on the need to match the length of the edge segment on one fabric piece and the length of the corresponding edge segment on the other fabric piece, the system can separately determine the value of tension force in each fabric piece. For example, one fabric piece may need to be stretched further than the other one and may have a larger desired tension force value. In another example, although both fabric pieces are stretched to the same degree, due to differences in material elasticity, one fabric piece may have a larger desired tension force value than the other.

For each fabric piece, the system can also obtain a measured value of the tension force in the fabric segment (operation 708). In some embodiments, at least one parallel arm of the pair of parallel arms can include a force sensor (e.g., a load cell) that can measure the tension force applied to the parallel arm, which corresponds to the tension force in the fabric segment. The system can then determine whether the measured tension force value matches the desired tension force value (operation 710). If not, the system can move the parallel jaws further apart (operation 712). Moving the jaws further apart can stretch out the fabric segment, thus removing all wrinkles and increasing the tension force in the fabric. Operations 708 through 712 can be repeated until the measured tension force value matches the desired tension force value. In this case, the system stops the movement of the parallel jaws (operation 714), because the fabric segment has been stretched to a desired length or a desired stretching effect has been achieved. The two robotic arms can then bring the two fabric pieces close to each other for the joining operation (operation 716). The joining operation can include but is not limited to: sewing, stapling, applying adhesive, fusing, etc. Operations 704 through 716 can be repeated for the entire to-be-joined edges of the fabric pieces to complete the joining of the fabric pieces along the edges.

Figure 8:
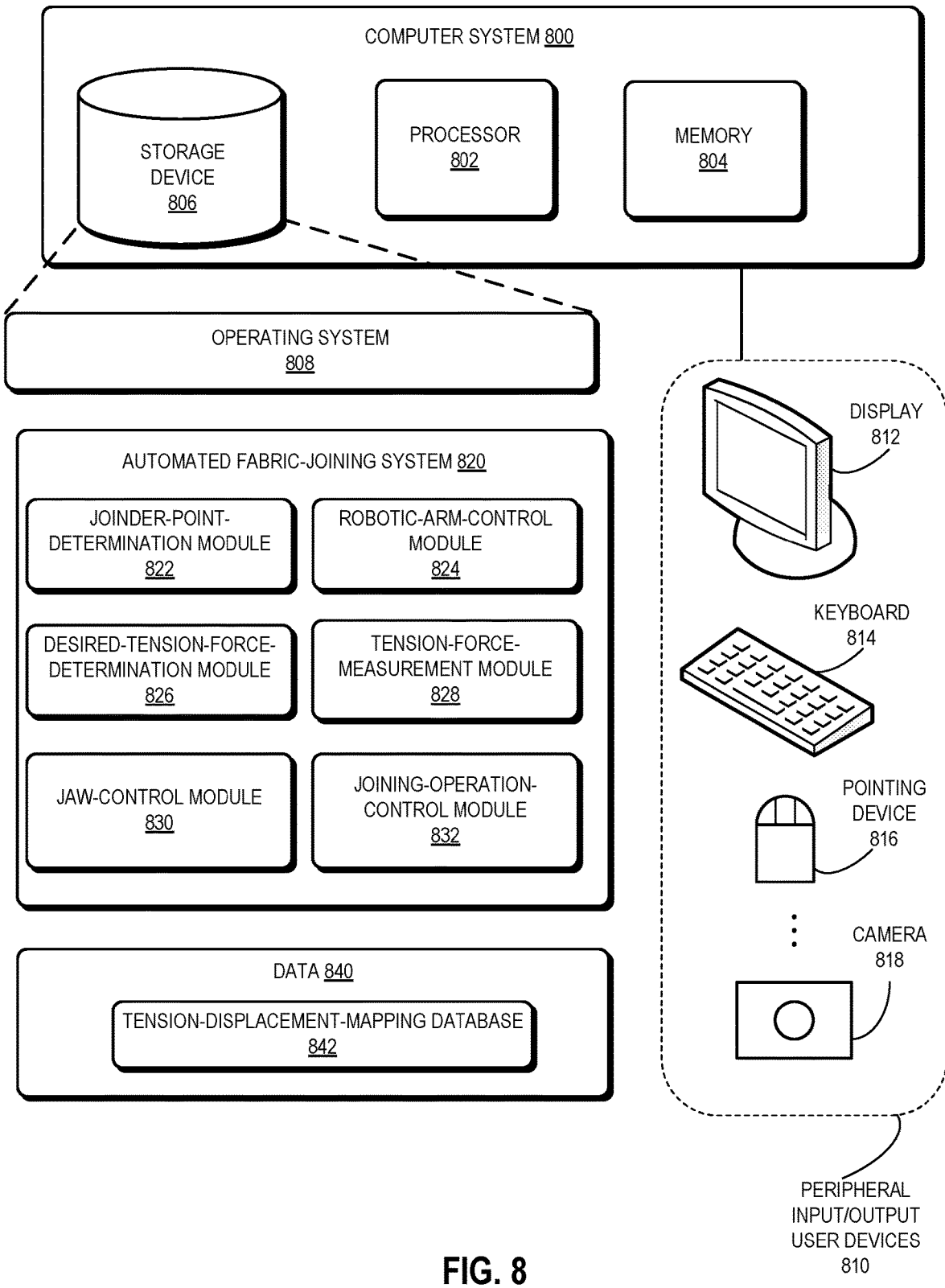
FIG. 8 illustrates an exemplary computer system for facilitating automated fabric-joining operations, according to one embodiment.

FIG. 8 illustrates an exemplary computer system for facilitating automated fabric-joining operations, according to one embodiment. In FIG. 8, computer system 800 can include a processor 802, a memory 804, and a storage device 806. Furthermore, computer system 800 can be coupled to peripheral input/output (I/O) user devices 810, e.g., a display device 812, a keyboard 814, a pointing device 816, and a camera 818. Storage device 806 can store an operating system 808, an automated fabric-joining system 820, and data 840.

Automated fabric-joining system 820 can include instructions, which when executed by computer system 800, can cause computer system 800 or processor 802 to perform methods and/or processes described in this disclosure. Specifically, automated fabric-joining system 820 can include instructions for determining joinder points on edges of fabric pieces (joinder-point-determination module 822), instructions for controlling movements of the robotic arms (robotic-arm-control module 824), instructions for determining the desired tension force in the fabric pieces (desired-tension-force-determination module 826), instructions for real-time measurement of the tension force in the fabric pieces (tension-force-measurement module 828), instructions for controlling movements of the parallel jaws based on the desired tension force and the measured tension force (jaw-control module 830), and instructions for controlling the actual joining operations (joining-operation-control module 832). Data 840 can include a tension-displacement-mapping database 842.

In some embodiments, the various modules in automated fabric-joining system 820, such as modules 822-832 can be partially or entirely implemented in hardware and can be part of processor 802. Further, in some embodiments, the system may not include a separate processor and memory.

Figure 9:
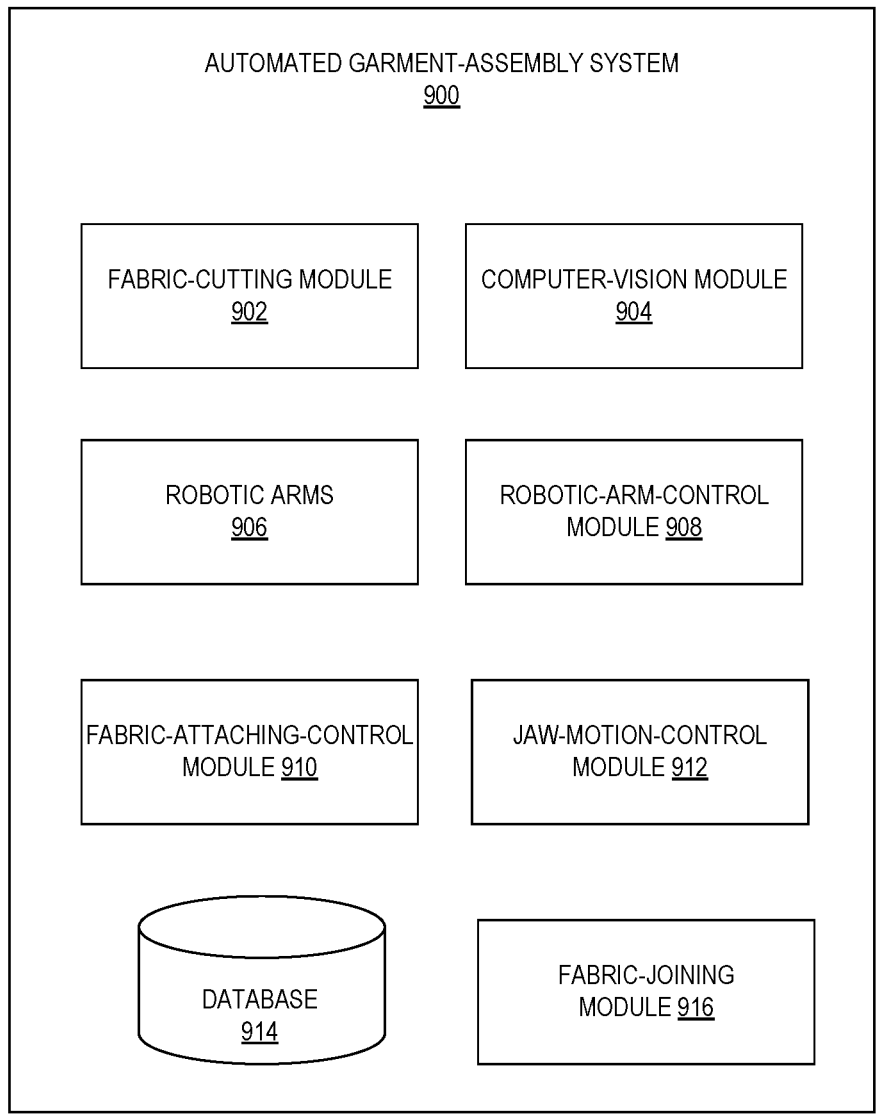
FIG. 9 illustrates an exemplary block diagram of an automated system for joining fabric pieces, according to one embodiment.

FIG. 9 illustrates an exemplary block diagram of an automated garment-assembly system, according to one embodiment. Automated garment-assembly system 900 can comprise a plurality of units or apparatuses that may communicate with one another via a wired, wireless, quantum light, or electrical communication channel. Automated garment-assembly system 900 may be realized using one or more integrated circuits and may include fewer or more units or apparatuses than those shown in FIG. 9. Further, automated garment-assembly system 900 may be integrated in a computer system or realized as a separate device that is capable of communicating with other computer systems and/or devices. Automated garment-assembly system 900 can include a fabric-cutting module 902, a computer-vision module 904, robotic arms 906, a robotic-arm-control module 908, a fabric-attaching-control module 910, a jaw-motion-control module 912, a database 914, and a fabric-joining module 916.

Fabric-cutting module 902 can be responsible for cutting the fabric into pieces according to a predetermined garment design pattern. Computer-vision module 904 can be responsible for determining joinder points on corresponding edges of to-be-joined fabric pieces. Robotic arms 906 can be responsible for picking up to-be-joined fabric pieces. In some embodiments, end effectors of robotic arms 906 can include parallel jaws, with each jaw equipped with a fabric-attaching module. Robotic-arm-control module 908 can be responsible for moving robotic arms 906. Fabric-attaching-control module 910 can be responsible for attaching the fabric pieces to the parallel jaws of the robotic arms 906. Jaw-motion-control module 912 can be responsible for controlling movements of the jaw such that the fabric pieces can be stretched to remove wrinkles and to achieve a desired stretching effect. Database 914 can store tension-jaw displacement mapping for different types of fabric. Fabric-joining module 916 can be responsible for joining the fabric pieces.

In general, the disclosed embodiments provide a system and method for automated joining of fabric pieces. The system can include robotic arms for picking up to-be-joined fabric pieces. More specifically, each robotic arm can include a pair of parallel jaws each equipped with a fabric-attaching module that can pick up a fabric piece at predetermined joinder locations. The fabric-attaching module can include needles and a solenoid actuator for engaging/disengaging those needles. To ensure that the to-be-joined edge is straight and wrinkle-free, the parallel jaws can stretch the fabric between the joinder locations until a predetermined tension force is applied to the fabric. A force sensor on the parallel jaw can provide a feedback signal to a control loop that controls the movement of the jaws to ensure that the desired tension force can be achieved. The desired tension force can be determined by searching a database based on a number of factors, including but not limited to: the type of the fabric, the thickness of the fabric, the weaving pattern of the fabric, and certain garment-design criteria. After both fabric pieces have been stretched to achieve the desired effect (e.g., to experience the desired tension force), the robotic arms can bring the fabric pieces close to each other to facilitate the joining operation, which can include but is not limited to: sewing, stapling, applying adhesive, fusing, etc.

The methods and processes described in the detailed description section can be embodied as code and/or data, which can be stored in a computer-readable storage medium. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
a first robotic arm and a second robotic arm;
a first pair of jaws coupled to the first robotic arm configured to grip a first fabric piece at a first pair of predetermined locations, and a second pair of jaws coupled to the second robotic arm configured to grip a second fabric piece at a second pair of predetermined locations, wherein a first distance between the first pair of predetermined locations is substantially equal to a second distance between the second pair of predetermined locations;
a first force sensor coupled to the first pair of jaws and configured to measure a first tension force applied to the first fabric piece by the first pair of jaws;
a second force sensor coupled to the second pair of jaws and configured to measure a second tension force applied to the second fabric piece by the second pair of jaws;
a first control module coupled to at least one jaw of the first pair of jaws and configured to control a first movement of the at least one jaw of the first pair of jaws based on the first measured tension force, wherein the first pair of jaws are attached to same wrist of the first robotic arm and are oriented in parallel to each other, and wherein the at least one jaw of the first pair of jaws is configured to move away from the other jaw to stretch the first fabric piece between the first pair of predetermined locations; and
a second control module coupled to at least one jaw of the second pair of jaws and configured to control a second movement of the at least one jaw of the second pair of jaws based on the second measured tension force, wherein the second pair of jaws are attached to same wrist of the second robotic arm and are oriented in parallel to each other, and wherein the at least one jaw of the second pair of jaws is configured to move away from the other jaw to stretch the second fabric piece between the second pair of predetermined locations.

2. The apparatus of claim 1, wherein, while controlling the first movement of the at least one jaw of first pair of jaws, the first control module is configured to compare the first measured tension force with a first predetermined desired tension force, and
　　wherein, while controlling the second movement of the at least one jaw of second pair of jaws, the second control module is configured to compare the second measured tension force with a second predetermined desired tension force.

3. The apparatus of claim 2, wherein the first control module is further configured to determine the first predetermined desired tension force based on one or more of:
　　a material type associated with the first fabric piece;
　　a thickness of the fabric piece;
　　a weaving pattern of the first fabric piece;
　　a garment-design criterion; and
　　an environmental temperature; and
　　wherein the second control module is further configured to determine the second predetermined desired tension force based on one or more of:
　　a material type associated with the second fabric piece;
　　a thickness of the second fabric piece;
　　a weaving pattern of the second fabric piece;
　　the garment-design criterion; and
　　the environmental temperature.

4. The apparatus of claim 2, wherein the first control module is further configured to:
　　determine a first tension-jaw displacement curve indicating a relationship between the first tension force applied to the first fabric piece and a first displacement between first the pair of jaws;
　　select a first point in a linear region of the first tension-jaw displacement curve; and
　　determine the first desired tension force based on the first selected point;
　　wherein the second control module is further configured to:
　　determine a second tension-jaw displacement curve indicating a relationship between the second tension force applied to the second fabric piece and a second displacement between second the pair of jaws;
　　select a second point in a linear region of the second tension-jaw displacement curve; and
　　determine the second desired tension force based on the second selected point.

5. The apparatus of claim 2, wherein the first control module is further configured to stop the first movement of the at least one jaw of the first pair of jaws in response to the first measured tension force substantially matching the desired first tension force, thereby achieving a desired first stretching effect on the first fabric piece, and
　　wherein the second control module is further configured to stop the second movement of the at least one jaw of the second pair of jaws in response to the second measured tension force substantially matching the desired second tension force, thereby achieving a desired second stretching effect on the second fabric piece.

6. The apparatus of claim 1, wherein each of a respective jaw comprises a fabric gripping mechanism configured to grip the first and second fabric piece respectively at the corresponding first and second predetermined locations respectively, and wherein the fabric-gripping mechanisms comprises a plurality of needles or a high-friction surface.

7. The apparatus of claim 6, wherein the fabric-gripping mechanisms each comprise an actuator for engaging and disengaging the first and second fabric piece respectively.

8. The apparatus of claim 1, wherein the each of the first and second force sensors comprise a load cell and one or more strain gauges.

9. The apparatus of claim 1, further comprising a first motor for moving the at least one jaw of the first pair of jaws and a second motor for moving the at least one jaw of the second pair of jaws.

10. The apparatus of claim 1, wherein the first and second control modules comprises a proportional-integral-derivative (PID) controller.

11. A computer-implemented method, comprising:
　　controlling a first and second pair of jaws attached to a first and second robotic arm respectively, the first pair of jaws operable to grip a first fabric piece at a first pair of predetermined locations and the second pair of jaws operable to grip a second fabric piece at second pair of predetermined locations, wherein a first distance between the first pair of predetermined locations is substantially equal to a second distance between the second pair of predetermined locations, and wherein the first pair of jaws are attached to a same first wrist of the first robotic and are oriented in parallel to each other, and wherein the second pair of jaws are attached to a same second wrist of the second robotic arm and are oriented in parallel to each other;
　　moving at least one jaw of the first pair of jaws away from the other jaw of the first pair of jaws to stretch the first fabric piece between the first pair of predetermined locations and moving at least one jaw of the second pair of jaws away from the other jaw of the second pair of jaws to stretch the second fabric piece between the second pair of predetermined locations;
　　measuring a first tension force applied to the first fabric piece by the first pair of jaws and measuring a second tension force applied to the second fabric piece by the second pair of jaws;
and
　　in response to the measured first and second tension forces substantially matching a predetermined desired tension force, stopping the movement of the at least one of a first jaw and a second jaw, thereby achieving a desired stretching effect on the fabric piece.

12. The method of claim 11, further comprising
determining the predetermined desired first and second tension forces based on one or more of:
a material type associated with the first and second fabric pieces respectively;
a thickness of the first and second fabric pieces respectively;
a weaving pattern of the first and second fabric pieces respectively;
a garment-design criterion; and
an environmental temperature.

13. The method of claim 11, further comprising:
　　determining a first tension-jaw displacement curve indicating a relationship between the first tension force applied to the first fabric piece and a displacement between the first pair jaws and determining a second tension-jaw displacement curve indicating a relationship between the second tension force applied to the second fabric piece and a displacement between the second pair jaws;
　　selecting a first and second point in a linear region of the first and second tension-jaw displacement curve;
and
　　determining the desired first and second tension forces based on the selected first and second points.

14. The method of claim 11, wherein gripping the fabric piece comprises attaching the fabric piece to each of the first and second pair of jaws using a plurality of needles or a high-friction surface.

15. The method of claim 11, wherein the first and second tension forces are measured using a first and second force sensor each comprising a load cell and one or more strain gauges.

16. A garment manufacturing system, comprising:
- a computer-vision module configured to determine a plurality of first and second joinder locations on corresponding edges of a first and second to-be-joined fabric pieces;
- a first robotic arm comprising a first pair of jaws configured to grip a first fabric piece at a first pair of determined joinder locations, wherein the first pair of jaws are attached to a same first wrist of the first robotic arm and are oriented in parallel to each other;
- a second robotic arm comprising a second pair of jaws configured to grip a second fabric piece at a second pair of determined joinder locations, wherein the second pair of jaws are attached to a same second wrist of the second robotic arm and are oriented in parallel to each other;
- a first force sensor coupled to the first pair of jaws and configured to measure a first tension force applied to the first fabric piece by the first pair of jaws;
- a second force sensor coupled to the second pair of jaws and configured to measure a second tension force applied to the second fabric piece by the second pair of jaws;
- a first control module coupled to at least one jaw of the first jaw and configured to control a first movement of the at least one of the first jaw to move the at least one of the first jaw away from the other first jaw to stretch the first fabric piece between the first pair of determined joinder locations;
- a second control module coupled to at least one jaw of the second jaw and configured to control a second movement of the at least one of the second jaw to move the at least one of the second jaw away from the other second jaw to stretch the second fabric piece between the second pair of determined joinder locations; and
- a fabric-joining module configured to join the to-be-joined first and second fabric pieces at the corresponding first and second edges.

17. The garment manufacturing system of claim 16, wherein, while controlling the first movement of the at least one jaw of the first jaw,
the first control module is configured to:
compare the first measured tension force with a first predetermined desired tension force;
stop the first movement of the at least one jaw of first jaw in response to the first measured tension force substantially matching the first predetermined desired tension force,
thereby achieving a desired first stretching effect on the first fabric piece;
and
wherein, while controlling the second movement of the at least one jaw of the second jaw,
the second control module is configured to:
compare the measured second tension force with a second predetermined desired tension force; and
stop the second movement of the at least one jaw of second jaw in response to the measured second tension force substantially matching the second predetermined desired tension force, thereby achieving a second desired stretching effect on the second fabric piece.

18. The garment manufacturing system of claim 17, wherein the first and second control module are configured to determine the first and second predetermined desired tension forces respectively based on one or more of:
- a material type associated with the first and second fabric pieces respectively;
- a thickness of the first and second fabric pieces respectively;
- a weaving pattern of the first and second fabric pieces respectively; and
- a garment-design criterion.

19. The garment manufacturing system of claim 16, wherein each respective jaw comprises a fabric-gripping mechanism configured to grip the first or second fabric pieces at the first and second pair of determined joinder locations respectively, and wherein the fabric-gripping mechanism comprises a plurality of needles or a high-friction surface.

* * * * *